Nov. 29, 1938.　　　H. RAABER　　　2,138,307
BOMB SIGHT
Filed Aug. 4, 1937　　　2 Sheets-Sheet 1
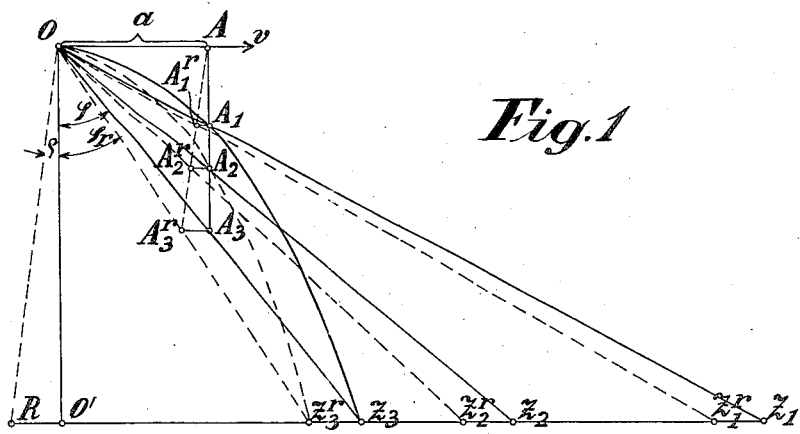
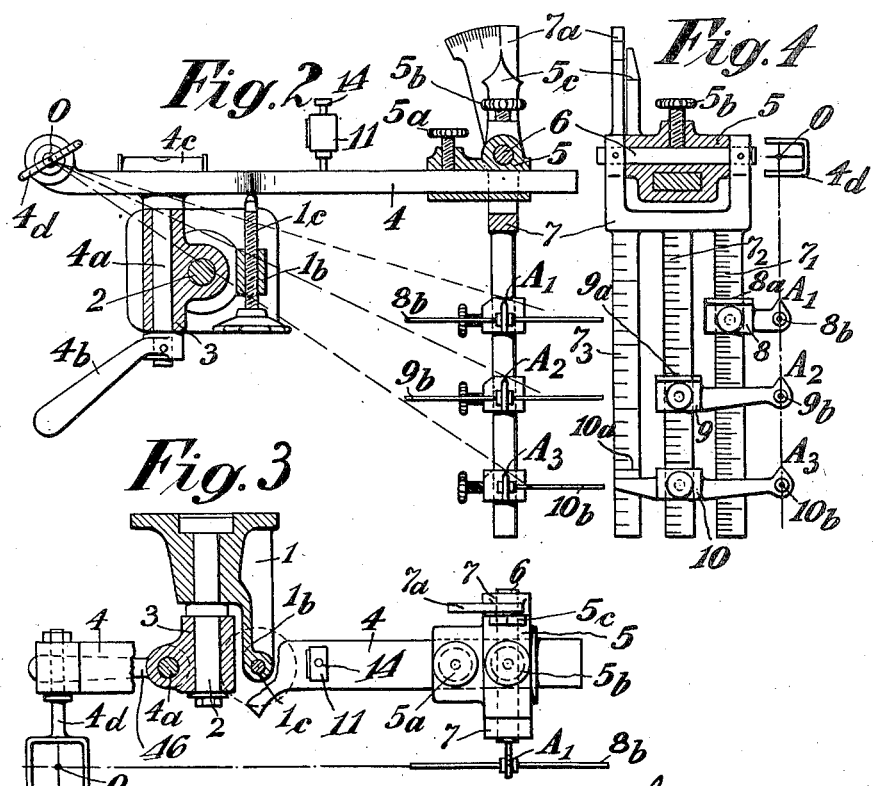
Inventor:
H. Raaber
By E. F. Wendroth
Atty Nov. 29, 1938.   H. RAABER   2,138,307
BOMB SIGHT
Filed Aug. 4, 1937   2 Sheets-Sheet 2

INVENTOR:
Hans Raaber
By E. F. Wenderoth
Attorney

Patented Nov. 29, 1938

2,138,307

UNITED STATES PATENT OFFICE 2,138,307.

BOMB SIGHT

Hans Raaber, Purkersdorf, near Vienna, Austria, assignor to Österr. Ung. Optische Anstalt C. P. Goerz Gesellschaft m. b. H., Vienna, Austria, a company of Austria Application August 4, 1937, Serial No. 157,434
In Germany August 24, 1936

5 Claims. (Cl. 33—46.5)

The invention relates to the determination of the line of sight corresponding to the proper moment for dropping objects from aircraft in order to hit the target, the said determination being made by means of a simple instrument without employing complicated clockwork mechanisms, as are heretofore deemed to be necessary in such instruments for the mechanical adjustment of the line of sight with respect to a certain preliminary sighting direction during a definite invariable measured time or a measured time dependent upon the height of fall.

This object is obtained according to the invention by providing on a rectilinear guide or frame, which is adapted to be levelled and adjusted in the direction of flight, a sighting mark fixed on said frame in a preferred embodiment a carriage slidable and adjustable on said frame or guide, the latter or the carriage having one, two or even three arms carrying parallel time scales which are rectangular to the frame or are adjustable by pivotal movement so as to be held inclined to the vertical by the angle of trail and a number, at least one, of sighting marks slidably mounted on said arm or arms, so as to be adjusted each with regard to the respective scale. Hereby lines of sight are provided passing through the fixed sighting mark and one or the other of the slidable marks. That line of sight having the smallest inclination is taken as first preliminary line of sight and on its coincidence with the approaching target an ordinary, if desired also reversible, stop-watch is actuated, while upon the coincidence with the target of the line of sight of the next greater inclination, forming a second preliminary line of sight, a measured time is found by stopping the stop-watch, from which time the line of sight for dropping is obtained when one of the existing sighting marks is adjusted on the corresponding scale according to this observed measured time. Further features and advantages of the invention will become clear from the following.

An embodiment of the invention is shown by way of example in the accompanying drawings, where:

Figure 1 shows the geometrical principle of the instrument,

Figure 2 is a side view of one form of the instrument,

Figure 3 is the plan view of the said instrument,

Figure 4 is a view from the rear.

Figure 5:
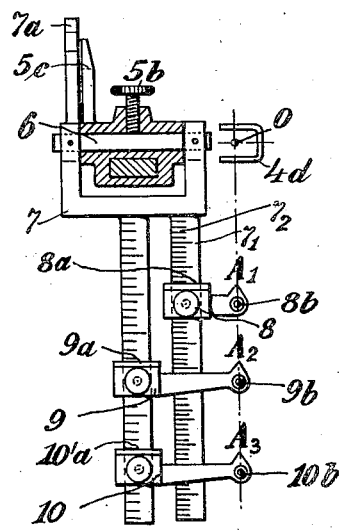
Fig. 5 is a similar view of a different embodiment.

In Figure 1, O is a sighting mark fixed on the aircraft moving horizontally at the speed $v$ relatively to the target and A is a point situated at a chosen distance $a$ from the fixed sighting mark in the direction of movement, which is crossed at said point A by a vertical line or by a line inclined to the vertical by the angle $\rho$ of trail. On this vertical line (the trail being not considered) a sighting mark $A_1$ adapted to be slid and clamped by hand is set at a distance $\overline{AA_1}$ below the horizontal O—A, where $\overline{AA_1}=c_1 \cdot T$ i. e. proportional to the particular time of fall T. For the purpose of adjusting this sighting mark, a scale of the time of fall with the proportionality factor $c_1$ is provided on the vertical line. At the moment at which the target approaching with the relative speed $v$ intersects at point $Z_1$ the first preliminary line of sight $\overline{OA_1}$, an ordinary stop watch is actuated, whereupon the sighting mark $A_1$ is shifted to $A_2$, according to a second scale of time of fall so that $\overline{AA_2}=c_2 T$. $c_2$ is the proportionality factor of the second time scale also provided on the said vertical line. If now at the moment at which the target intersects at $Z_2$ the second preliminary line of sight $OA_2$, the watch is stopped, whereby a measured time $t$ is obtained from which results, according to the following equations, the waiting time $t_w$ that must lapse before dropping, i. e. after which the target having travelled (relatively to the mark O) the distance $Z_2Z_3=v \cdot t_w$ intersects at the point $Z_3$ the line of sight $\overline{OA_3}$ existing in the proper moment of dropping at the point $Z_3$:

$$\overline{AA_3}=\overline{AA_1}+\overline{A_1A_3}=\overline{AA_2}+\overline{A_2A_3}$$

where $$\overline{A_1A_3}=c_1 t_g \text{ and } \overline{A_2A_3}=c_2 t_w$$

$t_g$ being equal to $t+t_w$.
Therefore $$AA_3=c_1(T+t_g)=c_2(T+t_w);$$

now the ratio of the scales $$\frac{c_2}{c_1}$$

being a constant $k$, $$T+t_g=k(T+t_w)$$

and $$T(k-1)=t_g-kt_w.$$

Now $$t_g=t+t_w$$

therefore $$T(k-1)=t+t_w-kt_w$$

that is, $$t_w(k-1)=t-T(k-1)$$

or $$(k-1)(T+t_w)=t \text{ or } T+t_w=\frac{t}{k-1}$$

Substituting this value in the equation $$T+t_g=k(T+t_w)$$

and multiplying both sides by $c_1$, it follows:

$$c_1(T+t_o) = c_1 k \frac{t}{k-1}$$

and since $$k-1 = \frac{c_2}{c_1} - 1 = \frac{c_2 - c_1}{c_1}$$

then $$c_1(T+t_o) = \frac{c_2 t \cdot c_1}{c_2 - c_1} = c_3 t = \overline{AA_3}$$

if $$\frac{c_1 c_2}{c_2 - c_1} = c_3$$

the proportionality factor of the waiting time scale.

For taking into account the trail, the vertical scale line $AA_3$ is inclined to the vertical by the angle of trail $\rho = O'OR$, so that the first preliminary line of sight is given by $OA_1{}^r$, the second by $OA_2{}^r$ and the line of sight for dropping by $OA_3{}^r$.

An embodiment of a sighting device is shown in Figures 2 to 4.

Fixed in a bracket 1 secured to the side of the aircraft is a horizontal pivot 2, on which the bearing 3 for the vertical pivot 4a of a substantially horizontal slide guide or frame 4 is rotatably mounted. The latter carries a fixed sighting mark O and also a slidable carriage 5 adapted to be clamped by means of the handscrew 5a. If this is done the total structure comprising the guide 4 and the slidable carriage 5 is obviously equivalent to a frame integrally comprising a piece like the carriage 5, said piece otherwise functioning exactly like the carriage with respect to the attached parts as set forth below. Of course, in such case the distance $a$ mentioned above is invariable. No illustration of this will be necesary. By means of an adjusting screw 1c screwed in the arm 1b of the bracket 1, the horizontal position of the rectilinear guide 4 with respect to the horizontal plane may be adjusted during flight with the aid of the spirit level 4c mounted on said guide 4.

Rotatable in the carriage 5 is a horizontal pin 6 which is adapted to be clamped by the handscrew 5b and is dowelled at both ends in a fork 7 embracing the carriage. This fork possesses three parallel square arms or rules $7_1$, $7_2$, $7_3$ with different time scales corresponding respectively to the proportionality factors $c_1$, $c_2$, $c_3$. One part of the fork has a section-shaped extension 7a, carrying on the periphery the angle of trail scale on which a pointer 5c provided on the carriage 5 serves for adjusting the angle of trail.

On the fork rule 7 is a slidable cursor 8 adapted to be clamped and provided with an upper adjusting edge 8a, which cursor carries the sighting mark $A_1$ having a direction of flight rob 8b arranged into the plane of sighting. On the fork rule $7_2$ are two such slidable cursors 9 and 10, adapted to be clamped and each carrying a sighting mark $A_2$ and $A_3$ respectively. While the adjusting edge 9a of the cursor 9 is in alignment with the scale of the rule $7_2$, the adjusting edge 10a of the cursor 10 moves on the scale of the rule $7_3$.

Rotatably secured to the rearward end of the substantially horizontal rectilinear guide 4 is the supporting frame 4d of a cross-wire forming the fixed sighting mark O situated during use in a common horizontal plane with the axis of the pin 6. The vertical plane of sight given by the sighting mark O and the three adjustable sighting marks $A_1$, $A_2$ and $A_3$ can be adjusted to the particular direction of flight that is, in accordance with the horizontal drift angle, by rotating a hand lever 4b fixed to the vertical pivot 4a.

The manipulation of this instrument is very simple: After selecting the dropping altitude, the two preliminary sighting marks $A_1$, $A_2$ are, by sliding and clamping the two cursors 8 and 9, respectively, on the rules $7_1$ and $7_2$, adjusted with the aid of the adjustment edges 8a, 9a on the corresponding time scales to the time of fall $T$ corresponding to the said dropping altitude and the aircraft is flown towards the target on a straight horizontal line. At the moment of the coincidence of the target with the first preliminary line of sight $\overline{AO_1}$, a stop watch 11 which may be arranged on the frame or guide 4, or elsewhere, is put in motion and at the moment of the coincidence of the target with the second preliminary line of sight $OA_2$, the watch 11 is stopped and the measured time $t$ is read off. The cursor 10 supporting the dropping sighting mark $A_3$ is then adjusted according to the said measured time $t$ on rule $7_3$ and now the moment of coincidence of the target with the dropping line of sight $OA_3$ indicates the proper moment for dropping. It is clear that in place of the three cursors 8, 9 and 10, it would be possible to employ two or even one cursor, if the reading edge of this one cursor was extended across all the three time scales and the sighting mark or the adjusting edge respectively of the cursor was first adjusted according to the time of fall $T$ on the rule $7_1$, then at the moment of the coincidence of the target with the first preliminary line of sight the stop-watch was put in motion, and thereupon, the sighting mark or the adjusting edge respectively of the cursor was adjusted on the rule $7_2$ also according to the time of fall $T$, and at the moment of coincidence of the target with this second preliminary line of sight the time $t$ was measured, and according sight the time $t$ was measured, and according to this time the sighting mark or the adjusting edge respectively of the cursor was adjusted on the time scale of the rule $7_3$ to the measured time $t$, thereby giving the line of sight $OA_3$ for dropping.

Fig. 5 is intended to show that the selection of the ratio $$k = \frac{c_2}{c_1} = 2$$

is particularly advantageous, since then $c_3 = c_2$, so that the rule $7_3$ of the fork 7 may be omitted and the reading edge $10'a$ of the cursor 10 is also in alignment with the scale $7_2$, on which the cursor 10 is adjusted according to the measured time $t$, whereby the line of sight for dropping $OA_3$ is determined.

Figure 6:
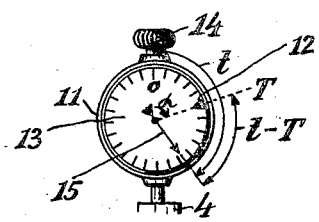
Fig. 6 shows in detail the face of a stop-watch to be used in connection with the invention.

In this case, $$T + t_w = \frac{t}{2-1}$$

or $t_w = t - T$. This circumstance makes it possible to determine the moment of dropping without adjusting the line of sight of dropping, so that the possibility of a hit is provided without sighting the target at the moment of dropping. For this purpose, the stop-watch as shown in detail in Fig. 6 may have a rotatable cover glass 13 with an index mark 12 etched on its edge and being adapted to be set for the time of fall. Furthermore the watch is made so that upon the first pressure of the control knob 14, the pointer 15 begins to move in the normal direction, and upon the second pressure the direction of rotation is reversed upon further actuation the pointer may be stopped or brought to zero. The following very simple method of manipulation of the whole apparatus is then provided: As in the first case, the preliminary sighting marks $A_1$, $A_2$ are adjusted on the rules $7_1$, $7_2$ according to the time of fall T and the aircraft is flown horizontally in a straight line towards the target with any desired position of the carriage 5. When the target comes into the first preliminary line of sight $OA_1$, the stop-watch being set to zero, and its cover glass mark having previously been set to the time of fall T, the pointer 15 is put in motion by a pressure on the control knob 14. When the target now comes into the second preliminary line of sight $OA_2$, a pressure on the control knob 14 reverses the movement of the pointer 15 which is at the moment of reverse indicating the measured time $t$ corresponding to angle $\alpha$, so that it is after the expiration of the waiting time $t_w$ that it reaches the cover glass mark 12 and thereby indicates the proper moment of dropping. This is also clearly to be seen from the relative position of the arrows $t$ and $t-T$ in Fig. 6.

What I claim is:

1. A sighting device for dropping objects from aircrafts, comprising a frame adapted to be levelled and to be adjusted in the direction of flight, a first sighting mark fixed on said frame, arms extending from said frame and carrying at least two parallel time scales, means for holding said scales inclined to the vertical by the angle of trail and at least one sighting mark slidably mounted on said arms, said sighting marks being severally adjustable with regard to the respective time scale.

2. A sighting device for dropping objects from aircrafts, comprising a frame adapted to be levelled and to be adjusted in the direction of flight, a first sighting mark fixed on said frame, a carriage slidably and adjustably mounted on said frame, means carrying at least two parallel time scales and being pivoted to said slidable carriage, means for holding said scales inclined to the vertical by the angle of trail and at least two sighting marks slidably mounted on said scale carrying means, said sighting marks being severally adjustable with regard to the respective time scale.

3. A sighting device for dropping objects from aircrafts, comprising a frame adapted to be levelled and to be adjusted in the direction of flight, a first sighting mark fixed on said frame, a carriage slidably and adjustably mounted on said frame, means carrying a first and a second time scale and being pivoted to said slidable carriage, means for holding said scales parallel to each other and inclined to the vertical by the angle of trail, the proportionality factor of said second time scale being equal to twice the proportionality factor of said first scale, and a second and a third sighting mark slidably mounted on said scale carrying means, said sighting marks being severally adjustable with regard to the respective time scale, and a stop-watch comprising means adjustable to a certain falling time and adapted to indicate the lapse of time equal to the difference between a measured time and the said falling time, whereby the proper moment of dropping may be determined without watching whether the target reaches a sighting line, but only by observing the moment at which the said difference of times has lapsed, the said measured time being obtained by actuating the said watch first at the moment at which the target coincides with the sighting line comprising the said first and second sighting mark, and secondly at the moment at which the target coincides with the sighting line comprising the said first and third sighting mark.

4. A sighting device according to claim 3, the stop-watch comprising an index mark adjustable to correspond to the falling time, and possessing a pointer adapted to start its forward movement upon the first actuation of the watch, but to reverse its motion upon the second actuation of the watch, so that the said difference is indicated at the moment at which the said pointer on its reverse movement coincides with the previously adjusted index mark.

5. A sighting device for dropping objects from aircrafts, comprising a frame adapted to be levelled and to be adjusted in the direction of flight, a first sighting mark fixed on said frame, a carriage slidably and adjustably mounted on said frame, means carrying three parallel time scales and being pivoted to said slidable carriage, means for holding said scales inclined to the vertical by the angle of trail, and a second, a third and a fourth sighting mark slidably mounted on said scale carrying means so as to be adjusted each with regard to the respective time scale, the proportionality factors ($c_1$ and $c_2$) of the first and the second one of said scales being independent of each other, the proportionality factor ($c_3$) of the third time scale being however a function $$\frac{c_1 \cdot c_2}{c_2 - c_1}$$

of the said factors of the first and second scale respectively.

HANS RAABER.